(12) United States Patent
Keefe et al.

(10) Patent No.: US 11,460,085 B1
(45) Date of Patent: Oct. 4, 2022

(54) TORSION SPRINGS WITH CHANGEABLE STIFFNESS

(71) Applicant: HRL Laboratories, LLC, Malibu, CA (US)

(72) Inventors: Andrew C. Keefe, Encino, CA (US); Geoffrey P. McKnight, Los Angeles, CA (US); Sloan P. Smith, Calabasas, CA (US); Christopher B. Churchill, Ventura, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/672,409

(22) Filed: Nov. 1, 2019

Related U.S. Application Data

(60) Continuation of application No. 15/726,204, filed on Oct. 5, 2017, now Pat. No. 10,495,171, which is a division of application No. 14/627,550, filed on Feb. 20, 2015, now Pat. No. 9,822,835.

(60) Provisional application No. 61/942,598, filed on Feb. 20, 2014.

(51) Int. Cl.
*F16F 1/14* (2006.01)
*F16F 3/02* (2006.01)

(52) U.S. Cl.
CPC ............. *F16F 1/145* (2013.01); *F16F 3/02* (2013.01); *F16F 2228/063* (2013.01)

(58) Field of Classification Search
CPC ...... F16F 1/14; F16F 1/145; F16F 3/02; F16F 3/026
See application file for complete search history.

(56) References Cited

U.S. PATENT DOCUMENTS

| | | | |
|---|---|---|---|
| 2,983,505 A | 5/1961 | Hanslip | |
| 3,767,181 A | 10/1973 | Van der Burgt | |
| 4,597,567 A | 7/1986 | Racca | |
| 4,884,790 A | 12/1989 | Castrilli | |
| 5,288,101 A | 2/1994 | Minnett | |
| 5,417,407 A | 5/1995 | Gordon | |
| 5,464,197 A | 11/1995 | Ecclesfield | |
| 5,611,524 A | 3/1997 | Gordon | |
| 5,630,758 A | 5/1997 | Riven | |
| 6,921,952 B2 | 7/2005 | Jeong | |
| 7,527,253 B2 | 5/2009 | Sugar | |
| 9,394,950 B1 | 7/2016 | Henry et al. | |
| 9,822,835 B1 * | 11/2017 | Keefe | F16F 1/145 |
| 10,030,731 B1 * | 7/2018 | Hundley | F16F 1/48 |
| 10,422,397 B1 | 9/2019 | McKnight et al. | |
| 10,495,171 B1 | 12/2019 | Keefe et al. | |

(Continued)

FOREIGN PATENT DOCUMENTS

| | | | | |
|---|---|---|---|---|
| AT | 507923 B1 | 11/2010 | | |
| DE | 10026178 A1 * | 2/2001 | ................ | F16F 1/13 |

(Continued)

*Primary Examiner* — Thomas J Williams
(74) *Attorney, Agent, or Firm* — Christopher R. Balzan, Esq.

(57) ABSTRACT

In at least one embodiment, a rotational spring is provided with adjustable stiffness and includes at least one beam arranged about an axis between an input tuning port and an output port, wherein the input tuning port is configured to change an effective bending length of at least one beam so as to change a shear stiffness with respect to the input tuning port and the output port.

16 Claims, 11 Drawing Sheets

(56) References Cited

U.S. PATENT DOCUMENTS

2013/0075966 A1  3/2013  Carvey et al.
2019/0118604 A1  4/2019  Suplin

FOREIGN PATENT DOCUMENTS

EP      2278183  B1    4/2013
JP      02236032  A  *  9/1990  ................ F16F 1/14

* cited by examiner

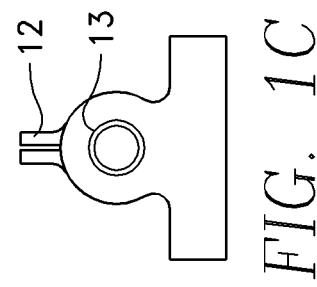
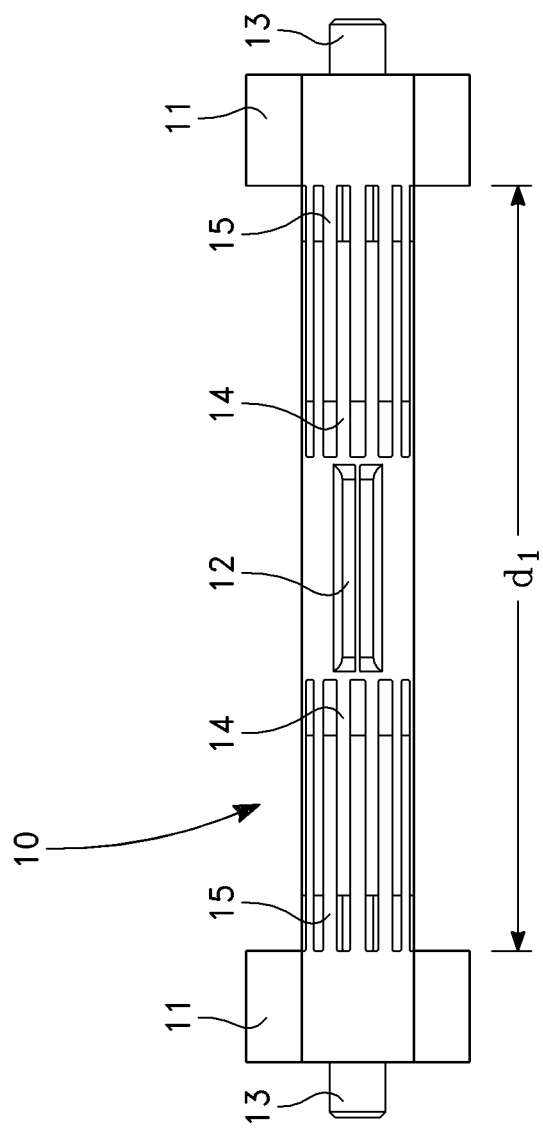 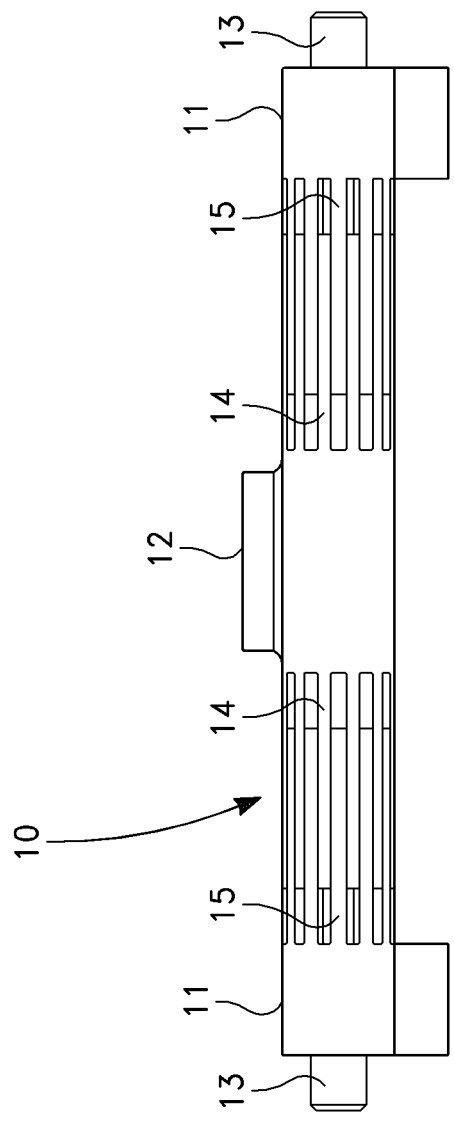

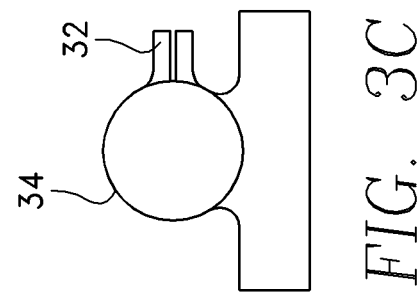
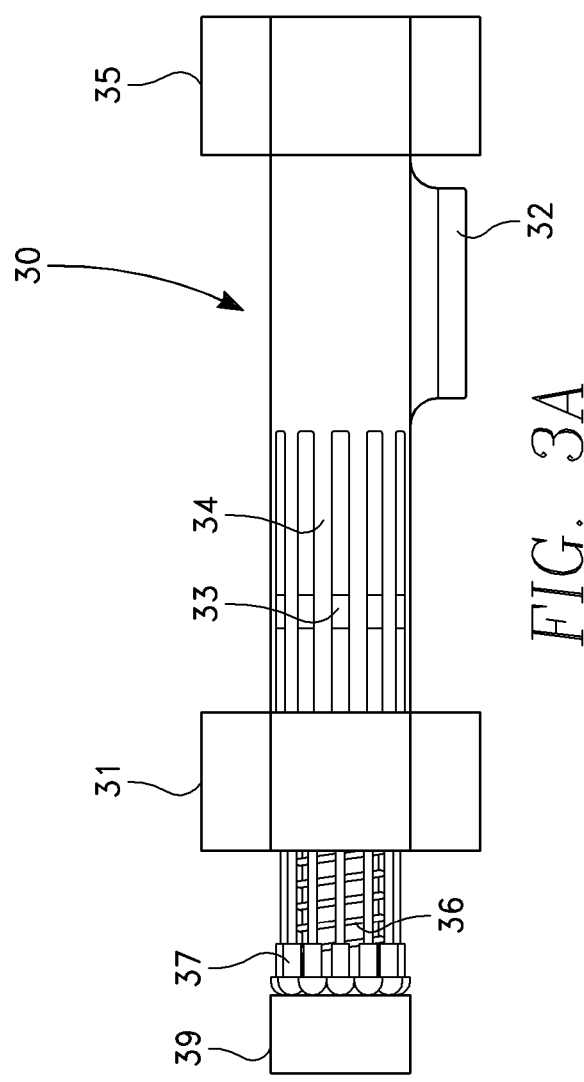
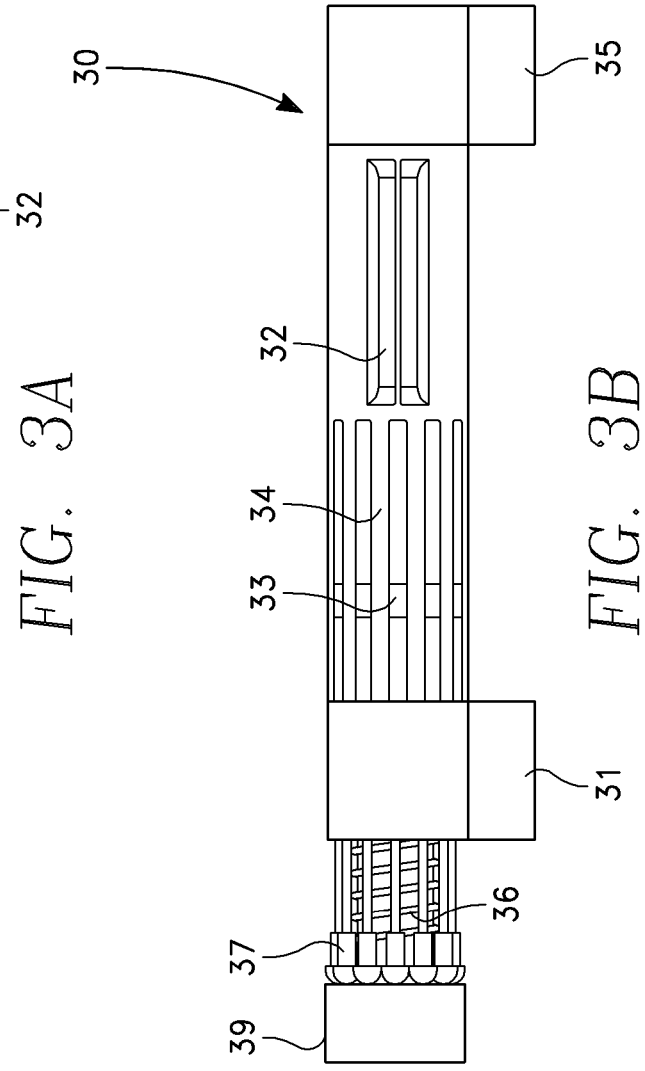

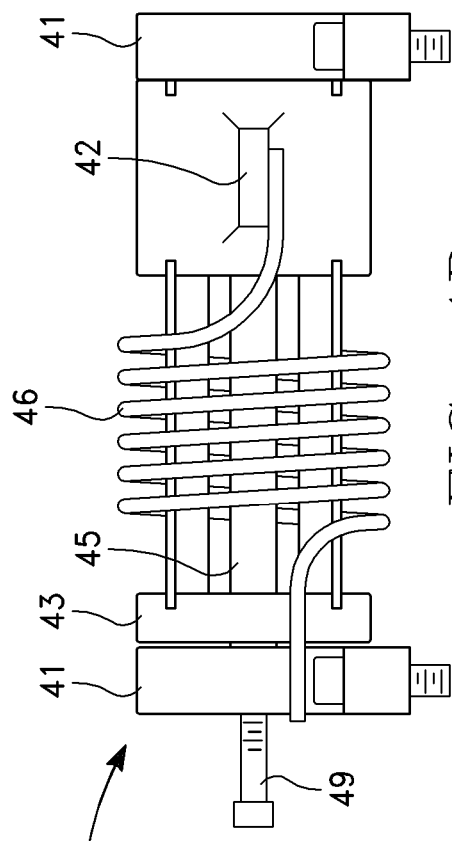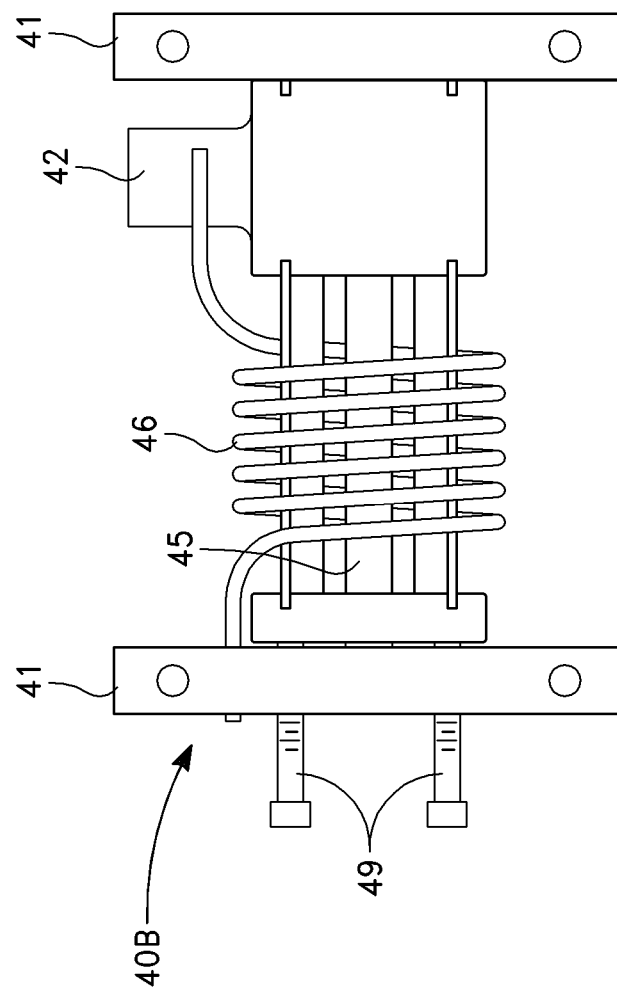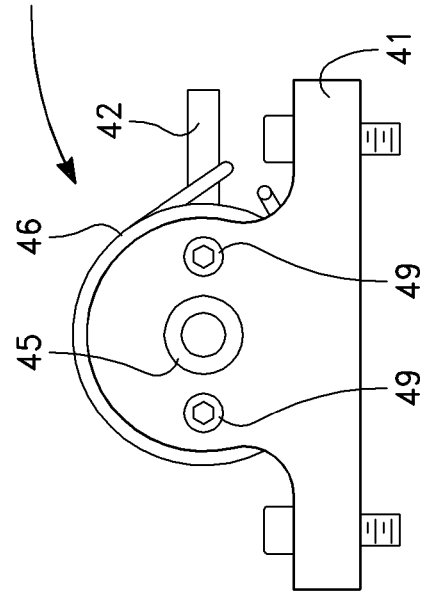

TORSION SPRINGS WITH CHANGEABLE STIFFNESS

CROSS REFERENCE TO RELATED APPLICATION

The present application is a continuation of U.S. patent application Ser. No. 15/726,204, by Keefe et al., entitled TORSION SPRINGS WITH CHANGEABLE STIFFNESS, filed Oct. 5, 2017, which is a divisional of U.S. patent application Ser. No. 14/627,550, by Keefe et al., entitled TORSION SPRINGS WITH CHANGEABLE STIFFNESS, filed Feb. 20, 2015, issued as U.S. Pat. No. 9,822,835, which claims the benefit of U.S. Provisional Application No. 61/942,598, by Keefe et al., entitled TORSION SPRINGS WITH CHANGEABLE STIFFNESS, filed Feb. 20, 2014, herein incorporated by reference in their entireties.

U.S. patent application Ser. No. 14/627,550 is related to U.S. patent application Ser. No. 13/802,197, filed Mar. 13, 2013, by Hundley et al., entitled ASSEMBLY WITH NEGATIVE TORSIONAL STIFFNESS, issued as U.S. Pat. No. 10,030,731, herein incorporated by reference in its entirety.

BACKGROUND

Torsion springs are typically made of either wound wire or coiled ribbon. With few exceptions, they possess a constant and nearly linear spring rate.

Torsion bars used in vehicle suspensions use a long prismatic tube as a spring. Their stiffnesses are not changeable nor able to generate the variety of stiffness envelopes (linear, hardening, softening, non-linear, and negative) that we claim.

What is needed is a torsion spring with adjustable spring rates. Moreover, what is needed is customizable non-linear of spring rate.

SUMMARY

In at least one embodiment, a rotational spring is provided with adjustable stiffness and includes at least one beam arranged about an axis between input tuning port and an output port, wherein the input tuning port is configured to change an effective bending length of the at least one beam so as to change a shear stiffness with respect to the input tuning port and the output port.

In one embodiment, the rotation spring includes at least one base having elongated beams spaced apart and in a generally longitudinal configuration about the axis. It further includes a rotatable section having elongated beams spaced apart and configured in a generally longitudinal configuration about the axis, the elongated beams of the rotatable section being at least partially interdigitated between the elongated beams of the at least one base. The relative distance between the at least one base and the rotatable section is adjustable such that adjusting the relative distance between the at least on base and the rotatable section changes an effective bending length of at least one of the elongated beams the at least one base, or elongated beams of the rotatable section.

In one embodiment, the rotation spring includes at least one base and a rotatable section having a plurality of beams configured in a generally cylindrical arrangement. In this embodiment, an adjustable slider apparatus extending through the at least one base and slidably engages the plurality of rotatable section beams to define the bending length of the plurality of beams.

In one embodiment, the rotational spring includes at least one base and a rotatable section. A shaft extends between the at least one base and the rotatable section retained thereon. At least one negative stiffness bending beam is mounted between the rotatable section and at least one base. At least one adjustment means extends through the at least one of the first base or the second base to apply a compression load on the at least one negative stiffness bending beam.

In one embodiment, the rotational spring includes a base having a base plate, a rotatable section having a rotatable plate opposing the base plate, and a plurality of radially oriented negative stiffness members each having a negative stiffness beam and a wedge portion. The plurality of radially oriented negative stiffness members each have an end distal from the wedge portion that slidably engages one of the base or the rotatable section. One of the base plate or the rotatable plate also includes wedge portions that oppose a corresponding wedge portion of one of the plurality of negative stiffness members such that adjusting a relative distance between the base plate and the rotatable plate causes the wedge portions of the plurality of radially oriented negative stiffness members to slidably engage opposing wedge portions of the one of the first base plate or the rotatable plate so as to change an effective bending length of the plurality of radially oriented negative stiffness beams.

In at least one embodiment an adjustable rotational spring is provided that includes a negative stiffness member and a torsional member having a torsional output. The torsional member is coupled to the negative stiffness member such that the torsional member and the negative stiffness member have different centers of rotation. An actuator may be provided to the negative stiffness member distal from a coupling of the negative stiffness member with the torsional member.

The following is a further summary of possible embodiments and/or features. The following further summary is not a complete listing of all of the potential embodiments and/or features of this disclosure.

As discussed briefly above, in at least one embodiment, a rotational spring is provided with adjustable stiffness and includes at least one beam arranged about an axis extending between an input tuning port and an output port, wherein the input tuning port is configured to change an effective bending length of the at least one beam so as to change a shear stiffness with respect to the input tuning port and the output port. In some embodiments, the input tuning port may be configured to change the effective length of the at least one beam so as to change a buckling mode of the rotational spring. In some embodiments, the at least one beam may include a negative stiffness member.

In some embodiments, the rotational spring may include at least one base having elongated beams spaced apart and in a generally longitudinal configuration about the axis, with a rotatable section having elongated beams spaced apart and configured in a generally longitudinal configuration about the axis, the elongated beams of the rotatable section being at least partially interdigitated between the elongated beams of the at least one base, and wherein a relative distance between the at least one base and the rotatable section is adjustable such that adjusting the relative distance between the at least on base and the rotatable section changes an effective bending length of at least one of: (1) the elongated beams of the at least one base; or (2) the elongated beams of the rotatable section. Some embodiments, may include an optional alignment shaft coupling the at least one base and the rotatable section. Some embodiments may include at least one torsional spring coupled between the at least one base and the rotatable section, the torsional spring being mounted about at least one of: (a) the elongated beams of the base, or (b) the elongated beams of the rotatable section. In some embodiments, the at least one base includes a first base with first beams extending laterally from the first base and a second base with second beams extending laterally from the second base, with the rotatable section being located between the first base and the second base, the central section having a beams at least partially interdigitated between the first beams on a first side and at least partially interdigitated between the second beams on a second side, the first base and the second base being separated by a relative distance such that adjusting the relative distance between the first base and the second base changes an effective bending length of at least one of: (1) the first beams; (2) the second beams; or (3) the beams of the rotatable section. In some embodiments, an alignment shaft extends through the first base, the central section, and the second base, the alignment shaft being coaxially aligned with the interdigitated beam members. In some embodiments, the first base and the second base each included a generally cylindrical portion, the first beams extending from the generally cylindrical portion of the first base, and the second beams extending from the generally cylindrical portion of the second base. In some embodiments the first beams and the second beams slidably engage the beams of the central section. Some embodiments may include an interlocking sliding joint between at least one of the first beams or the second beams and the beams of the central section. Some embodiments may have a sleeve around the at least partially interdigitated beams of the rotatable central section. In some embodiments, the central section includes shaped cut outs to form the beams of the central section, the shaped cut outs being configured to receive the first beams on the first side and to receive the second beams on the second side. Some embodiments include at least one torsional spring mounted about the first beams or/and the second beams. Some embodiments may include an alignment shaft extending through the first base, the central section and the second base coaxially aligned with the interdigitated beam members, and wherein the first base and the second base each comprise a generally tubular portion, the first beams extending from the generally tubular portion of the first base and the second beams extending from the generally tubular portion of the second base to engage the beams of the rotatable central section, and wherein the rotatable central section has an output connector.

In some embodiments, the rotational spring may include at least one base, a rotatable section having beams configured in a generally cylindrical arrangement, and an adjustable slider apparatus extending through the at least one base and slidably engaging the rotatable section beams to define the bending length of the beams. In some embodiments, the adjustable slider apparatus has and adjustment screw. In some embodiments, the adjustment screw has a screw head, and wherein the adjustable slider apparatus comprises connecting rods extending from the screw head to a beam engagement end of the adjustable slider apparatus. In some embodiments, the connecting rods have a bearing surface in contact with the screw head. In some embodiments the adjustable slider apparatus includes a spring biasing the adjustment screw. In some embodiments, the adjustable slider apparatus includes an actuator. In some embodiments, the adjustable slider apparatus includes an electric motor.

Some embodiments may include a first and a second base, the rotatable section being located between the first and second base.

In some embodiments, the rotational spring may include at least one base, a rotatable section having the output port, at least one negative stiffness member bending beam mounted between the rotatable section and the at least one base, and the input tuning port having an adjustment means to adjust an effective bending length of the at least one negative stiffness member. In some embodiments, the at least one negative stiffness member bending beam is mounted to the base, and wherein the adjustment means comprises a means to adjust a distance between the base and the rotatable section. In some embodiments, the at least one negative stiffness member bending beam is mounted to an adjustment plate, and wherein the adjustment means includes a means to adjust a distance between the adjustment plate and the rotatable section. In some embodiments, the rotational spring is configured such that the adjustment means is capable of adjusting a length of the at least one negative stiffness member bending beam available for bending. In some embodiments, the rotational spring is configured such that the adjustment means is capable of applying a compression load on the at least one negative stiffness member bending beam. In some embodiments, the rotational spring has a shaft extending between the at least one base and the rotatable section retained thereon, and the adjustment means extends through the at least one base to apply the compression load on the at least one negative stiffness bending beam. Some embodiments include a positive stiffness spring coupled between the at least one base and the rotatable section in parallel with the at least one negative stiffness bending beam. In some embodiments, the positive stiffness spring is a tension wire spring. In some embodiments, the positive stiffness spring is a coil spring. In some embodiments, the at least one negative stiffness bending beam includes multiple negative stiffness bending beams. In some embodiments, the at least one base includes a first base and a second base, wherein the rotatable section is located between the first base and the second base and the at least one negative stiffness bending beam has multiple first negative stiffness bending beams extending between the rotatable section and the first base, and a positive stiffness spring coupled between the rotatable section and at least one of the first base or the second base. In some embodiments, the second negative stiffness bending beams extend between the rotatable section and the second base, and wherein the adjustment means includes a means for applying a compression load to the multiple second negative stiffness bending beams. In some embodiments, the first base has a first adjustment means associated therewith for applying a compression load to the first negative stiffness bending beams, and wherein the second base has a second adjustment means associated therewith for applying a compression load to the second negative stiffness bending beams, and wherein the first adjustment means comprises a first compression screw for applying a compression load to the first negative stiffness bending beams, and wherein the second adjustment means includes a second compression screw for applying a compression load to the second negative stiffness bending beams. In some embodiments, the first adjustment means includes a first adjustment plate, wherein the first negative stiffness bending beams are mounted with the first adjustment plate, and wherein the first adjustment means is configured such that the first compression screw applies a compression load to the first negative stiffness bending beams via the first adjustment plate, and wherein the second adjustment means further includes a second adjustment plate, wherein the plurality of second negative stiffness bending beams are mounted with the second adjustment plate, and wherein the second adjustment means is configured such that the second compression screw applies a compression load to the second negative stiffness bending beams via the second adjustment plate. In some embodiments, the positive stiffness spring comprises a tension spring. In some embodiments, the positive stiffness spring includes at least one coil spring. In some embodiments, the base has a base plate, the a rotatable section includes a rotatable plate opposing the base plate, the at least one negative stiffness member bending beam includes radially oriented negative stiffness members each having a negative stiffness beam and a wedge portion, the plurality of radially oriented negative stiffness members each having an end distal from the wedge portion slidably engaging one of the base or the rotatable section, and one of the base plate or the rotatable plate has wedge portions opposing a corresponding wedge portion of one of the negative stiffness members such that adjusting a relative distance between the base plate and the rotatable plate causes the wedge portions of the radially oriented negative stiffness members to slidably engage opposing wedge portions of the one of the first base plate or the rotatable plate so as to change an effective bending length of the radially oriented negative stiffness beams. In some embodiments, the base plate and the rotatable plate are coupled via an alignment shaft extending between the first base plate and the rotatable plate. In some embodiments, the base plate is adjustable with respect to the base. In some embodiments, the base is adjustable with respect to a second base, the second base having a second base plate, and wherein the rotatable section has a second rotatable plate opposing the second base plate. In some embodiments, the wedge portions of either the negative stiffness beams or the wedge portions opposing the wedge portion of the negative stiffness member further include at least one wedge guide.

In at least one embodiment, an adjustable rotational spring is provided including a negative stiffness member, a torsional member having a torsional output, the torsional member being coupled to the negative stiffness member such that the torsional member and the negative stiffness member have different centers of rotation, and an actuator coupled to the negative stiffness member distal from the coupling of the negative stiffness member with the torsional member. In some embodiments, the torsional member is coupled to the negative stiffness member at the torsional output. In some embodiments, the torsional output allows an arc of movement, wherein the negative stiffness member is positioned on a same side of the arc of movement as the torsional member. In some embodiments, the torsional output allows an arc of movement, wherein the negative stiffness member and the torsional member are located within the arc of movement. In some embodiments, the torsional output allows an arc of movement, and wherein the negative stiffness member is positioned on a side of the arc of movement opposite than the torsional member. In some embodiments, the torsional output allows an arc of movement, and wherein the torsional member is located within the arc of movement and the negative stiffness member is located outside the arc of movement. In some embodiments, the torsional member includes a swing arm and a rocker having an axis of rotation, the swing arm being connected to the rocker distal from the torsional output. In some embodiments, the negative stiffness member is connected to the swing arm. In some embodiments, the negative stiffness member is connected to the rocker. Some embodiments include a positive stiffness spring coupled to the torsional member. In some embodiments, the positive stiffness spring is connected to the swing arm. In some embodiments, the positive stiffness spring is connected to the rocker.

DESCRIPTION OF THE DRAWINGS

These and other features, aspects, and advantages of the present invention will become better understood with reference to the following description, appended claims, and accompanying drawings where:

FIG. 1A is a top view illustration of one embodiment of a torsion spring with changeable stiffness.

FIG. 1B is a front view illustration of the embodiment of a torsion spring with changeable stiffness of FIG. 1A.

FIG. 1C is a right side view illustration of the embodiment of a torsion spring with changeable stiffness of FIG. 1A.

FIG. 3A is a top view illustration of one embodiment of a torsion spring with changeable stiffness.

FIG. 3B is a front view illustration of the embodiment of a torsion spring with changeable stiffness of FIG. 3A.

FIG. 3C is a right side view illustration of the embodiment of a torsion spring with changeable stiffness of FIG. 3A.

FIG. 4C is a left side view illustration of the embodiment of the torsion spring with changeable stiffness of FIG. 4B.

FIG. 4D is a front view illustration of the embodiment of the torsion spring with changeable stiffness of FIG. 4B.

FIG. 4E is a top view illustration of the embodiment of the torsion spring with changeable stiffness of FIG. 4B.

DESCRIPTION

Figure 2C:
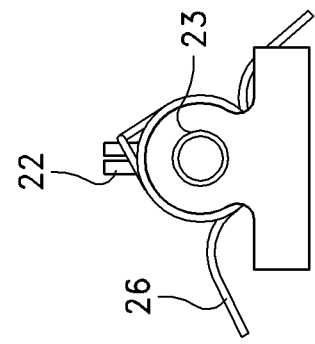
FIG. 2C is a right side view illustration of the embodiment of a torsion spring with changeable stiffness of FIG. 2A.

In various embodiments, provided are beams arranged in a circular pattern between input and output ports. With several specific geometries, the tuning port can change the beam effective length, change shear stiffness (with respect to the input/output ports), and/or change buckling mode. Various embodiments may provide increased packaging efficiency over competing designs, especially for systems where rotary input/output is desired.

Various embodiments of the present invention provide torsions springs with adjustable spring rates and/or customizable non-linearity of spring rate including regions of negative stiffness. In some embodiments, the bending of prismatic beams is converted into torque. The bending length of the beams can be adjusted to change the output spring rate (stiffness) proportional to the cube of the length. The beam geometry can be designed to maximize torque conversion or to tailor the spring rate as a function of angular displacement.

In some embodiments, torsion springs are provided with adjustable spring rates. In further embodiments, the adjustable spring rates include a customizable non-linear spring rate and may include regions of negative stiffness.

Adjustable stiffness (spring rates) can provide important benefits to dynamic systems. In the simple example of a single degree-of-freedom vibrating mass on a spring, the natural frequency is the square root of the stiffness divided by the mass. If the mass were to change (e.g., a fuel tank being emptied) in a system where the natural frequency should be kept constant (e.g., in a vehicle) the stiffness must be changed proportionally. These changes may be linear or non-linear.

Torsion springs are typically constructed of wound wire, where the wire diameter, and the winding pitch and diameter define the torsional stiffness. In a typical adjustable torsion spring, the winding diameter of a wire spring is forced to widen about a mandrel, thus lowering its stiffness. Ribbons ('hair springs') have been used as torsional springs, particularly in watches, and retractors (e.g., seat belts). These are typically very low force components since they rely on the curl of a ribbon in its thin direction.

Various embodiment of the present invention use beam-bending to create the torsional stiffness. Stiffness is adjustable by changing the effective beam bending length. It is well known in beam theory that the stiffness of a cantilever beam is inversely proportional to the cube of the length. Thus, by varying the effective length of our torsion beam-springs we can effect large changes with small adjustments. Unlike previous torsion springs, this design can be adjusted in-place, without need for re-attaching; the adjustment could likewise be made automatically with the addition of a motor/actuator and controller. Furthermore, the spring rates can be designed with prescribed non-linearity as a function of angular displacement by using different geometries and materials in the bending beams.

This technology applies generally to any dynamic system that currently uses torsion springs for suspension or vibration control. The ability to change spring rate enables adjustability without replacement/reconnection. Additionally, the rate may be adjusted with an actuator/motor. Variable spring rates/stiffnesses are advantageous in systems where the environmental dynamics change or when the payload mass changes (e.g., varying road surfaces, changing fuel volume, respectively). The ability to create negative torsional stiffness is a key component to non-linear torsional isolators.

A first embodiment of the bending-beam torsion springs 10 with changeable stiffness is shown in FIGS. 1A-1C. The base blocks 11 define the mechanical ground. The distance di between the two base blocks 11 are adjustable using a rail, or a screw mount, not shown. The output connector or output port of the spring torque is the central section 12. A shaft 13 may be desirable to preserve alignment. The effective bending lengths of the interdigitated beam members 15 and 14 protruding from base blocks 11 and output connector 12, respectively, is changed by adjusting the distance di between base blocks 11, thus creating a stiffness change using an input tuning port. One additional element not shown in the drawings is a method to constrain the motion of the finger elements or beam members 15 and 14 with respect to one another. By adding a sliding joint between the fingers 15 and 14 (such as rail that extends in an angular direction from one finger and slips into a corresponding track in the adjacent finger) the motion of the fingers 15 and 14 will be locked out where they overlap and the primary compliance will results from the non-overlapped region. Another concept to achieve a similar result is a tight fitting sleeve attached to component 12 that prevents out of plane displacement.

Figure 2A:
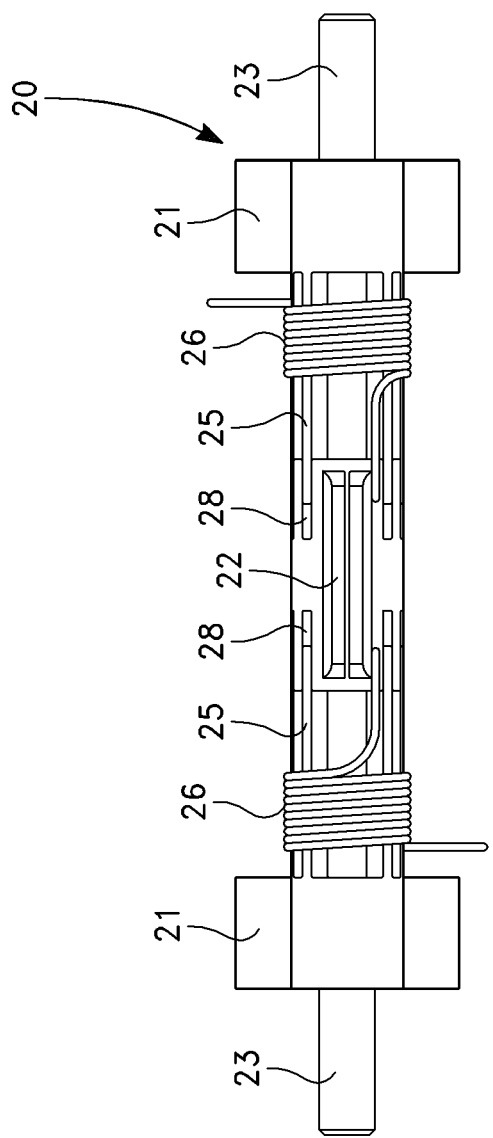
FIG. 2A is a top view illustration of one embodiment of a torsion spring with changeable stiffness.
Figure 2B:
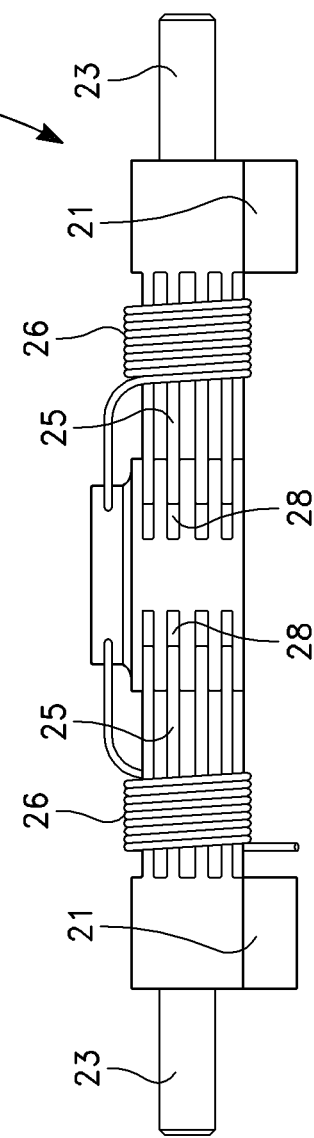
FIG. 2B is a front view illustration of the embodiment of a torsion spring with changeable stiffness of FIG. 2A.

A more compact variation of the above concept is shown in FIG. 2. Here the bending beams 25 protrude only from base blocks 21 and insert into shaped cutouts 28 in output connector 22. Both base blocks 21 and output connector 22 are mounted upon a shaft 23. Common torsion springs 26 are mounted about the bending beams of base blocks 21 to provide additional torsional stiffness if desired; however, this can also provide for additional non-linearity: should the bending beams 25 be forced radially outward as the output connector 22 is rotated, the beams will be forced against the common torsion springs 26 and confined, but also—if desired and so designed—force the diameter of the common torsion springs 26 to widen and soften.

An embodiment of the torsion spring with changeable stiffness 30 is shown in FIGS. 3A-3C. In this embodiment, the base blocks 31 and 35 do not require relative displacement to change the beam bending length, which could be a practical challenge for some applications. In this third embodiment, the output connector 32 is built with the bending beam spring features. Adjustable position sliders 33 are slidably mounted through base block 31 and are used to define the bending length of the bending beam 34 springs features. The location of the adjustable position sliders are determined by an adjustment means such as threaded adjustment screw 39, which could alternatively be an electric motor or other actuator at the input tuning port. The adjustable position sliders 33 are fitted at one end with caps 37 that they act as a bearing surface with threaded adjustment screw 39 but also as a force surface for return spring 36 that is used to preserve the position of the adjustable position sliders 33 in contact with threaded adjustment screw 39. Other methods for preserving the position of the sliders with the adjustment mechanism are also possible; this particular version is to illustrate the principles involved. The aspect ratio of the fingers 34 will control the relative force and displacement characteristics of the variable stiffness joint.

Figure 4A:
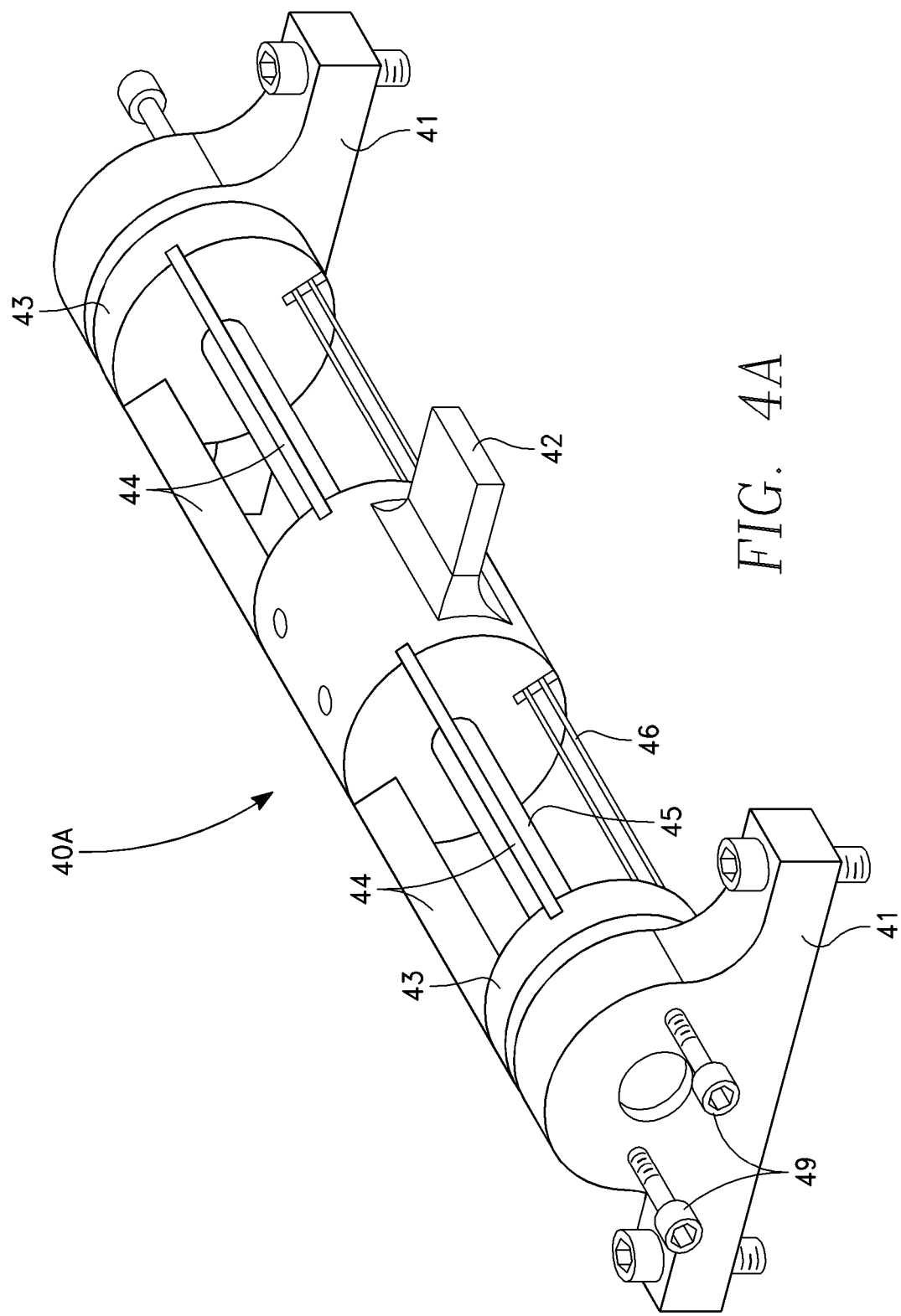
FIG. 4A is a perspective view illustration of one embodiment of a torsion spring with changeable stiffness, showing a design for a spring with a region of negative stiffness.

A fourth embodiment that exhibits an extremely non-linear stiffness, including a region of negative stiffness, is presented in FIG. 4A. Fixed-position base blocks 41 establish a mechanical ground. Output connector 42 is centrally mounted to shaft 45. Also mounted to shaft 45 is a pair of adjustment plates 43. Bending beams 44 are fixed between output connector 42 and adjustment plates 43. Compression screws 49 or other adjustment means apply a compression load to bending beams 44 through adjustment plates 43 such that the bending beams 44 are placed in a first-mode buckled state at the initial angular position of the output connector 42. This state of compression creates an instability where the output connector 42 will snap from one angular position another which manifests as a negative torsional stiffness through that angular change. For stiffness control applications a positive spring 46 would be included in parallel with this variable negative stiffness bending beam spring 44. This could be a traditional torsional coil spring 46c connecting the ground point 41 with the rotating point 42.

Figure 4B:
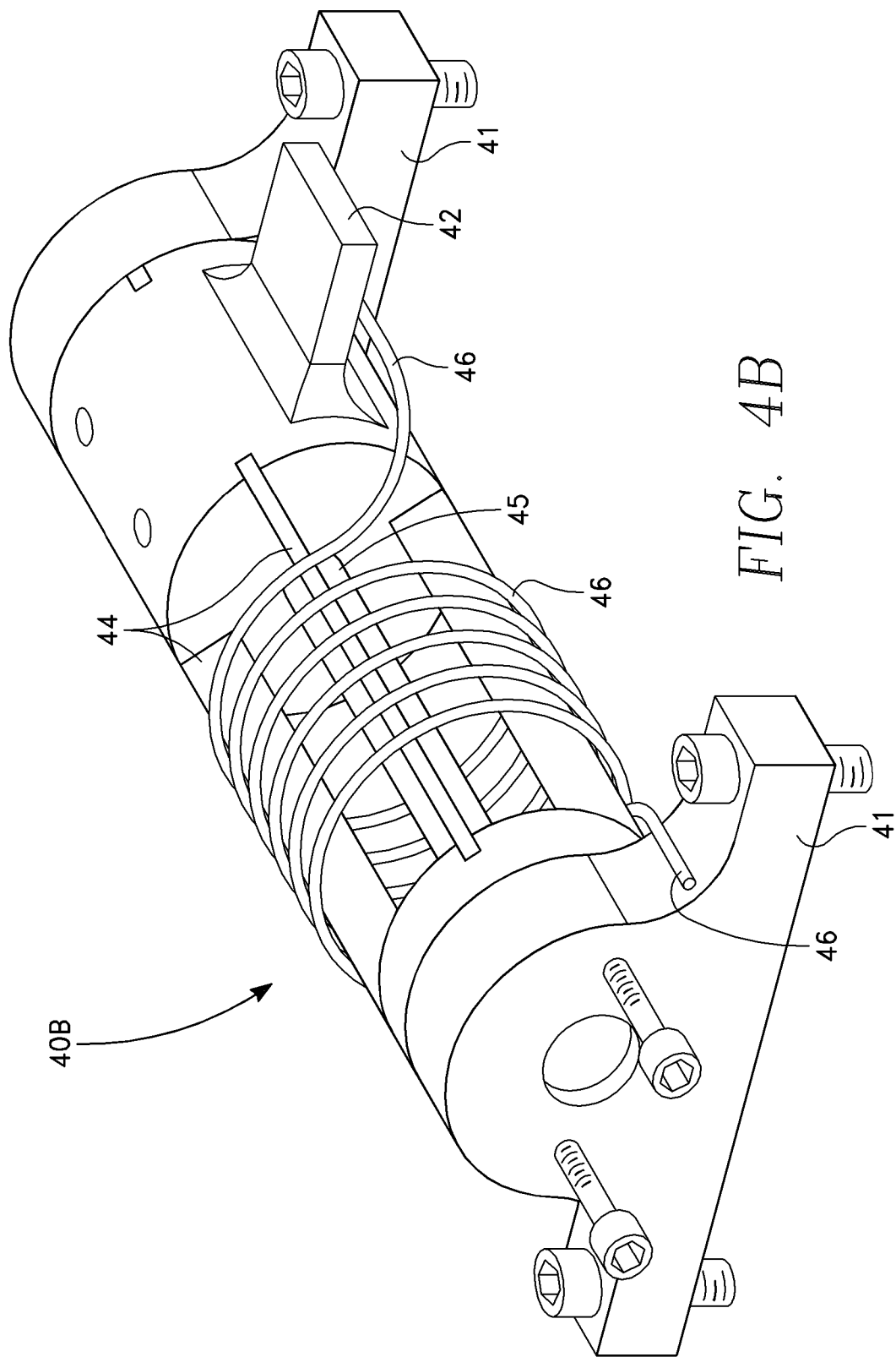
FIG. 4B is a perspective view illustration of one embodiment of a single side torsion spring with changeable stiffness, showing a design for a spring with a region of negative stiffness.

The embodiment of FIG. 4A can also be improved to be a device with a single input adjustment in the same manner that the embodiment of FIGS. 3A-C improves upon embodiments of FIGS. 1A-C and 2A-C, as illustrated in FIGS. 4B and 4C-E. FIG. 4B is a perspective view illustration of one embodiment of a single side torsion spring with changeable stiffness, showing a design for a spring 40 with a region of negative stiffness. FIGS. 4C-E shows top, front, and side views of the single side torsion spring with changeable stiffness of FIG. 4B.

It should also be understood that the bending beam geometry used in these illustrations is not optimized for generating the most efficient conversion of bending to torque. Beam cross sections can be designed such that their shear centers provide a maximum torque from bending.

Referring to FIGS. 5A-D, a fifth embodiment of this invention utilizes radial-orientated beams 54b rather than axially-orientated (axially refers to the rotational axis of the spring) beams as the previous embodiments make use of. By using radial beams 54b (FIG. 5C), the axial volume of the torsion spring is reduced with a tradeoff for increased radial volume. The base blocks 51 define the mechanical ground. The distance between the two base blocks 51 is adjustable using a rail or screw mount, not shown. The output connector or coupler 52c of the spring torque is the central section 52. A shaft 53 may be desirable to preserve alignment. The radial position of the beam member 54 is adjusted by the base blocks 51, which provide an input tuning port. As the distance between the base blocks 51 decreases, the wedges 51w on the plate portion 51p of the base blocks 51 force the wedges 54w at the top of the beams 54b down or inward. Similarly, as the distance between the base blocks 51 increases, the wedges 51w of the base blocks 51 allow the springs 56 at the inward edge of the beams 54b to push the beams 54b back out. This action is similar to the motion of a mechanical chuck. The ends of the beams 54b opposite the beam wedges 54w slide into/out of guides 52g in a hub portion 52h of the central section 52. The effective bending lengths of the radial beam members 54b changes as the beam wedges 54w move inward/outward radially, thus creating a stiffness change. The wedges 54w are retained against rotation by wedge guides 51g. The wedges 54w and 51w, as used herein, may have full (54w) or truncated (51w) wedge shapes or other sloped surfaces.

Figure 5A:
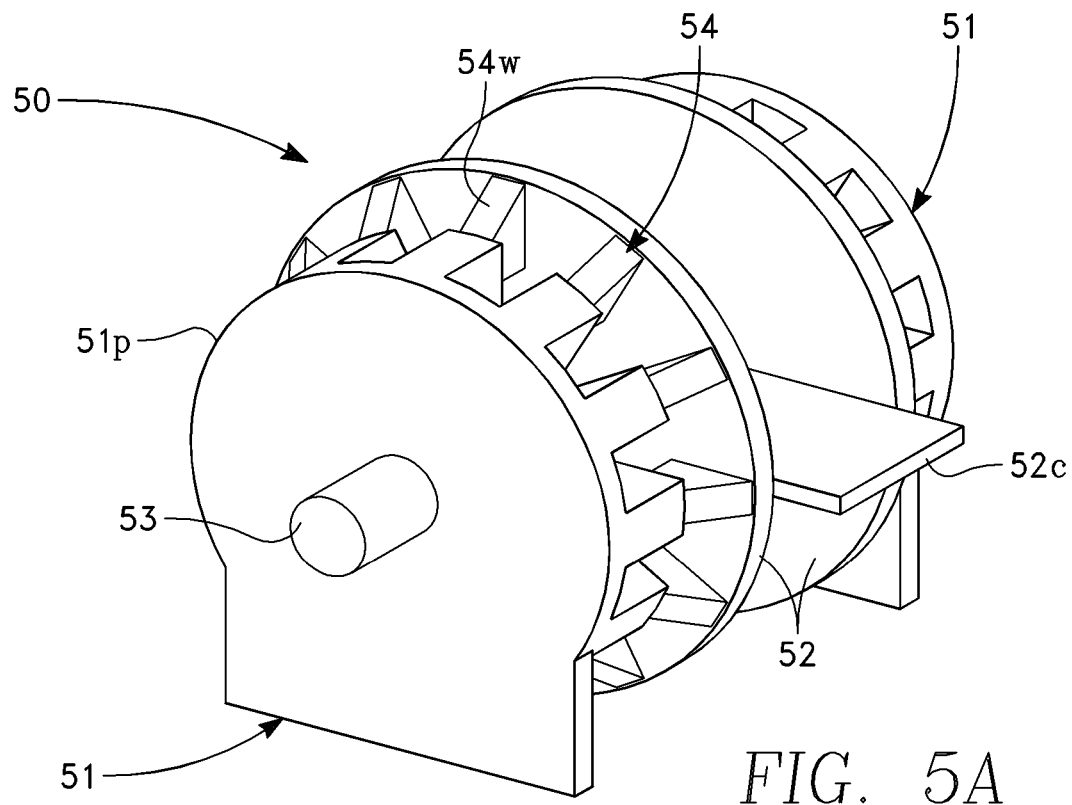
FIG. 5A is a perspective view illustration of one embodiment of a torsion spring with changeable stiffness and radially orientated beams.
Figure 6:
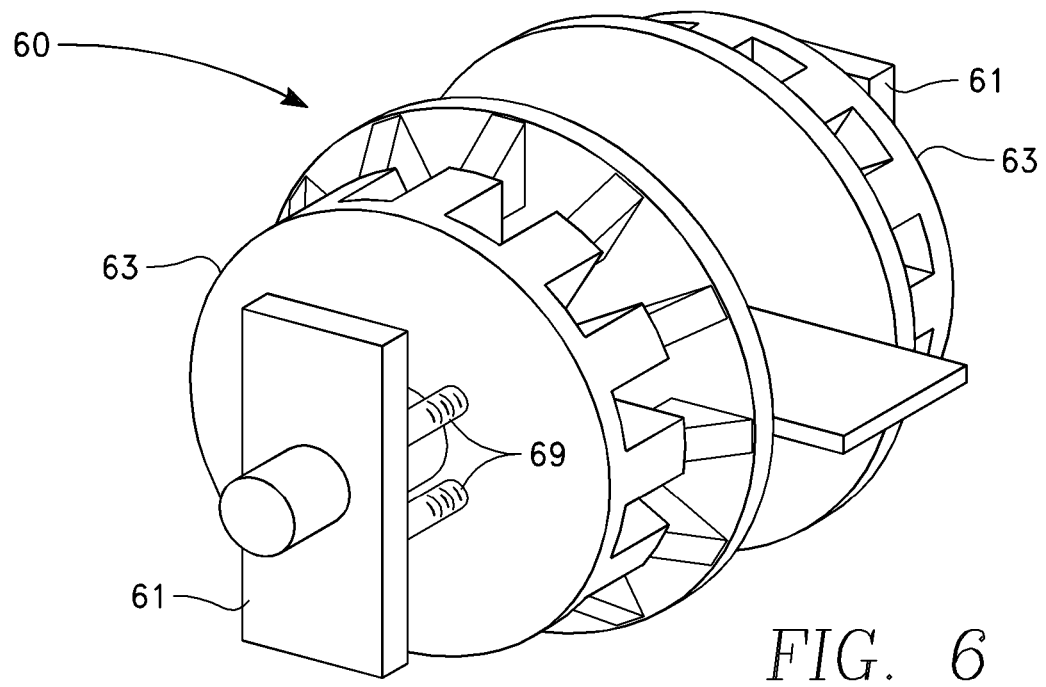
FIG. 6 is a perspective view illustration of one embodiment of a torsion spring with changeable stiffness and radially orientated beams.
Figure 5B:
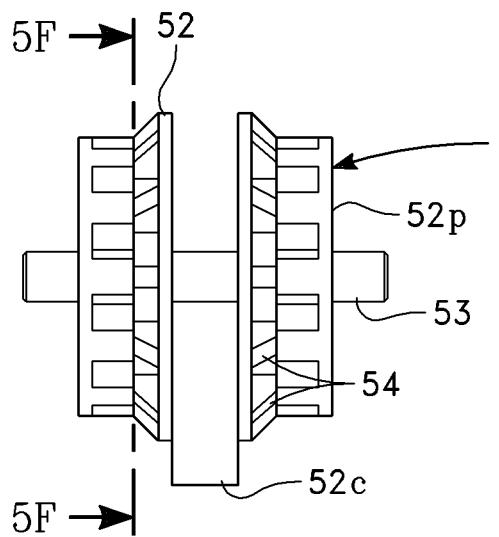
FIG. 5B is a top view illustration of the embodiment of a torsion spring with changeable stiffness of FIG. 5A.
Figure 5C:
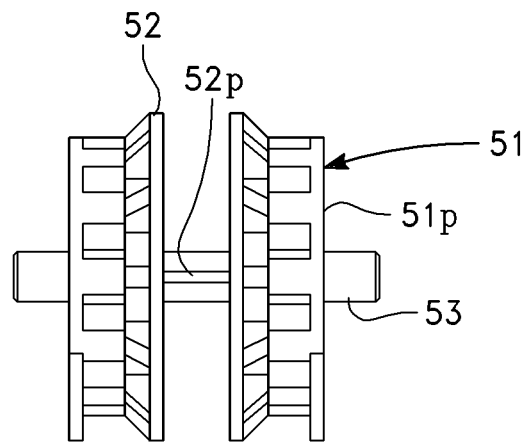
FIG. 5C is a front view illustration of the embodiment of a torsion spring with changeable stiffness of FIG. 5A.
Figure 5D:
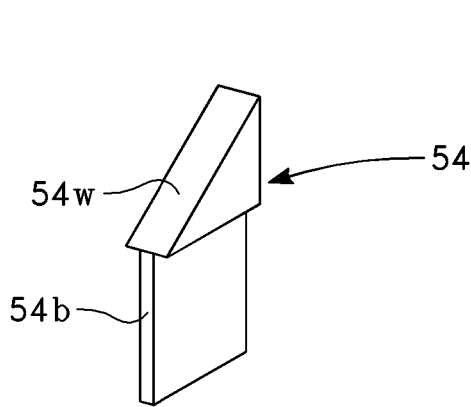
FIG. 5D is a perspective view illustration of a possible beam embodiment for the torsion spring with changeable stiffness of FIG. 5A.
Figure 5E:
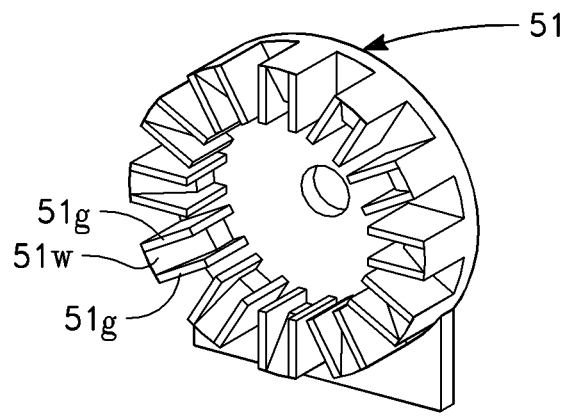
FIG. 5E is a perspective view illustration showing a possible base embodiment for the torsion spring with changeable stiffness of FIG. 5A.
Figure 5F:
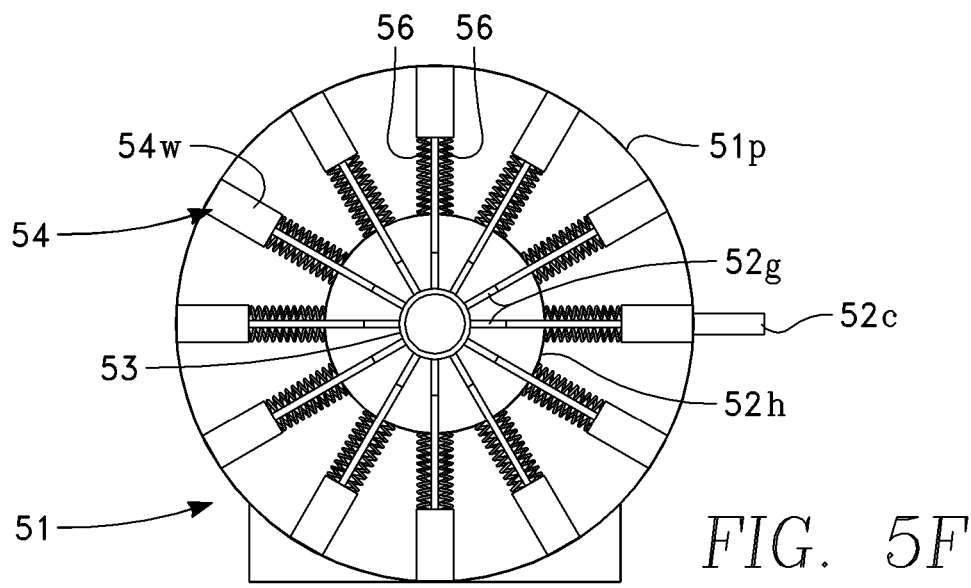
FIG. 5F is a cut away side view illustration taken along the 5F-5F line of FIG. 5A showing a possible central section embodiment for the torsion spring with changeable stiffness.

This embodiment could be improved upon by decoupling the axial motion clamping plates, represented in FIG. 5A as component 51p, from the mechanical ground, in the axial direction, while maintaining rigidity between the base blocks and the mechanical ground in the rotational direction. This concept is represented in FIG. 6. The base blocks 61 define the mechanical ground and the adjustment plates or clamping plates 63 are driven along the rotation axis by some type of adjustment means such as drive screw or actuator 69 at the input tuning port. The clamping blocks are still mechanically coupled to the base blocks in the rotational axis, but they can now move along the axial direction and thus provide an input tuning port. This embodiment could have only one side, i.e. one clamping plate, if desired.

Figure 7A:
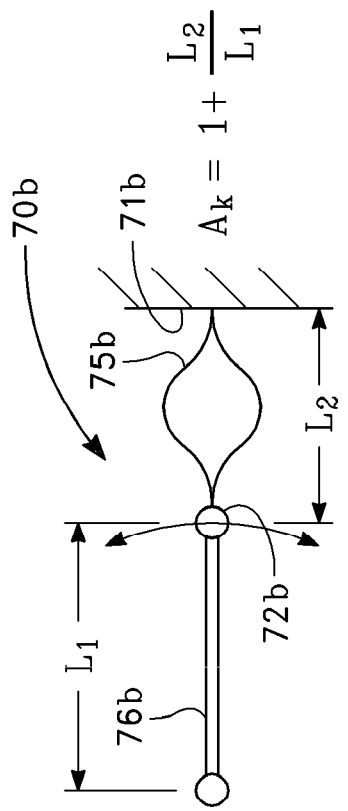
FIG. 7A is a schematic illustration of an embodiment which includes an adjustable negative stiffness spring that has a different center of rotation than the torsion output.
Figure 7B:
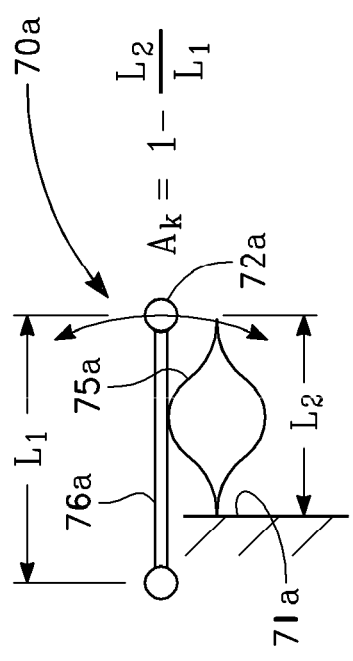
FIG. 7B is a schematic illustration of an alternate embodiment which includes an adjustable negative stiffness spring that has a different center of rotation than the torsion output.

Turning to FIGS. 7A and 7B, shown are other embodiments that deliver negative torsional stiffness without the radial symmetry of previous embodiments. FIGS. 7A and 7B are schematic illustrations of embodiments 70a and 70b, which include adjustable negative stiffness springs and have different centers of rotation than the torsion output. Here, the adjustable member 75a or 75b is placed in the radial direction, but with a different center of rotation than the output port shaft 72a or 72b. Typically, there is only one negative stiffness member 75a or 75b, and they are not repeated in radial symmetry. The effect has a beneficial amplification of either negative stiffness or mechanism stroke.

The embodiments 70a and 70b of FIGS. 7A and 7B include adjustable negative stiffness springs 75a and 75b, respectively, that have different centers of rotation than the torsion output 72a and 72b, respectively. FIGS. 7A and 7B show the two different versions of this geometry. Both versions have some torsional element 76a and 76b, respectively, of length/radius L1 and some compressed spring of length L2. The spring 75a or 75b includes an actuator at its base 71a or 71b that changes the amount of compression in the spring 75a or 75b, respectively. Though the spring 75a or 75b is drawn as a compressed mode-3 clamped-clamped beam, it could also be any other spring including other beam mode shapes, coil springs, plate spring, cantilever, etc. The preferred spring would be a compressed mode-3 spring as drawn, or a pinned coil spring.

The geometry for these embodiments vary in that the center of rotation for L2 is either on the same side of the output point (FIG. 7A) or the opposite, outboard side of the output point (FIG. 7B). The ratio of L2 to L1 determines the amount of amplification that this embodiment delivers to the "natural" negative stiffness of the system, which occurs if L1 is of infinite radius. Typically L2 is smaller than L1, between 20% and 80% of its value. In the FIG. 7A version, the embodiment tends to amplify the range of motion of the system at the expense of reduced negative stiffness. In the FIG. 7B version, the embodiment amplifies the negative stiffness at the expense of reduced range of motion.

Figure 8A:
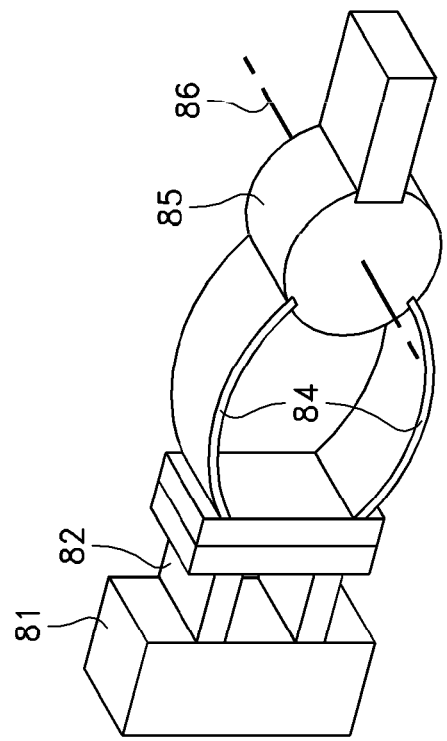
FIG. 8A is a perspective view of an embodiment in accordance with the schematic illustration of FIG. 7B illustrating the beams in straight non-buckled state.
Figure 8B:
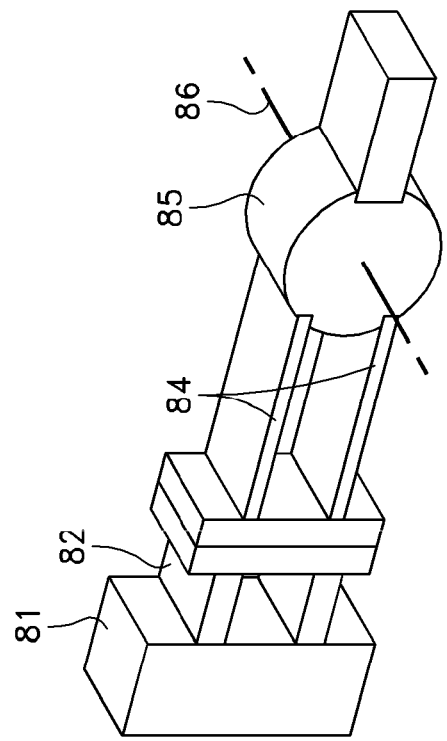
FIG. 8B is a perspective view of an embodiment in accordance with the schematic illustration of FIG. 7B illustrating the beams in buckled state.

FIGS. 8A and 8B are perspective views illustrating another embodiment employing rotational boundaries and buckling beams. The difference between this embodiment and FIGS. 7A and 7B is that the rotational center does not move. Here, two beams 84 capable of buckling are connected close together (the two beams 84 are shown in both a straight non-buckled state FIG. 8A and in a buckled state in FIG. 8B), but still on opposite sides of pivot point about which force is extracted 85. A pivot point axis 86 extends through the center of the circular structure 85 and is assumed to be grounded mechanically with respect to 81. An actuator 82 at the input tuning port induces compression in the beams, thus making them reversibly negative stiffness elements. In some embodiments, this device would only be capable of small deformations about the axis of +/−~30 degrees but could be relatively stiff in the highest stiffness configuration and could exhibit significant stiffness change. Again, attaching a rotational positive spring to the system would stabilize the negative element and permit stable large changes in stiffness over a broad range of conditions. Similar to some of our previous embodiments, this system can use either mode 1 or mode 3 type beam conditions depending on the stiffness and angular throw requirements of the system. Any substantial twist (~2-4 degrees) would require a mode 3 type beam approach which would limit the stiffness change to two discrete static stiffnesses.

Figure 9:
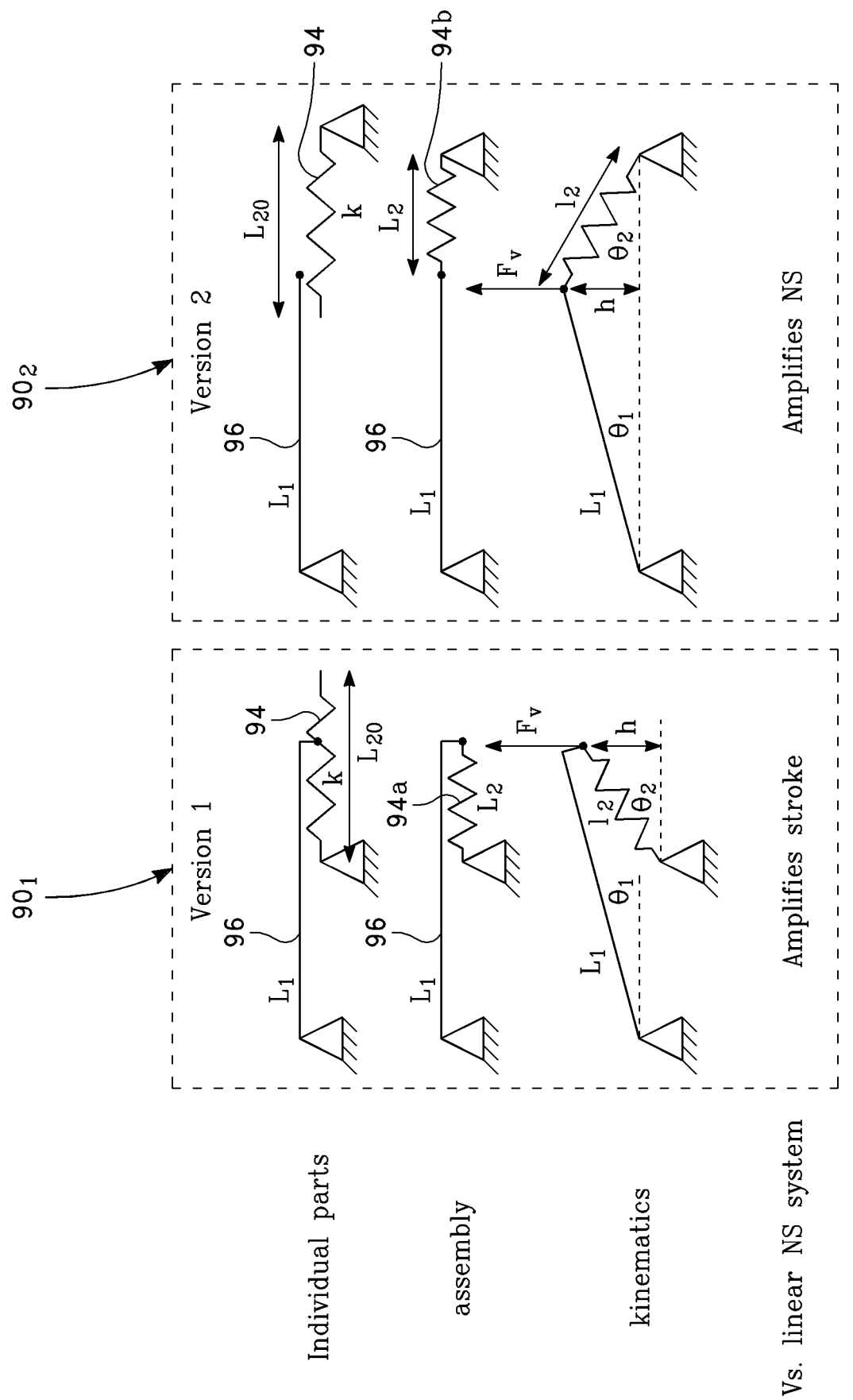
FIG. 9 shows simplified schematic illustrations of variable negative stiffness embodiments with rotating linkages.

FIG. 9 shows simplified schematic illustrations of variable negative stiffness embodiments 901 and 902 with rotating linkages. In the left embodiment 901, variable torsional negative stiffness is provided by including at least one rotating rigid link 96, and one negative stiffness element 94. The negative stiffness element 94 is positioned so that it is in parallel with the rigid link 96 at some point in the expected linkage motion. A spring 94 with stiffness k has a free length of L20, which is compressed to L2 when assembled with linkage 96. If pre-compression is high enough, the mechanism will have a negative torsional stiffness, which can either be measured by the vertical reaction force $F_v$ (drawn) or a reaction torque about angle $\theta_1$, which is simply $F_v * L_1$ for small angles.

As the equations of motion show, when compared to the linear motion case of described in U.S. non-provisional application Ser. No. 14/214,242, filed Mar. 14, 2014, entitled METHODS TO DYNAMICALLY ALTER THE STIFFNESS OF NONLINEAR STRUCTURES, which claimed the benefit of provisional application 61/800,827, filed Mar. 15, 2013, entitled METHODS TO DYNAMICALLY ALTER THE STIFFNESS OF NONLINEAR STRUCTURES, both herein incorporated by reference in their entireties, version 1, reference number 901, amplifies available stroke, while version 2, reference number 902, tends to amplify negative stiffness (NS). This is most obvious in the first term of the force term, where version 1 is $L_1-L_2$ (lower stiffness) and version 2 is $L_1+L_2$ (higher stiffness).

The spring drawn in FIG. 9 could be a linear coil spring as drawn, or could also be a nonlinear, post-buckled beam, as described in the above referenced U.S. non-provisional application Ser. No. 14/214,242 and provisional application 61/800,827. The difference in the equation of motion is that the post-buckled beam will have its own nonlinear stiffness k which is no longer constant, but a function of $L_2$. Note that by compressing the spring, $L_2$ will decrease and thus increase the negative stiffness.

In the embodiments 901 of version 1 on the left side of FIG. 9, $F_v(\theta 1)=$ $$Fv(\theta1) = \frac{k(L1-L2)\left(-120 + \frac{\sqrt{2L1^2 - 2L1L2 + L2^2 - 2L1(L1-L2)\cos[\theta1]}}{\sqrt{(-L1+L2+L1\cos[\theta1])^2 + L1^2\sin[\theta1]^2}}\right)\tan[\theta1]}{}$$

In the embodiments 902 of version 2 on the right side of FIG. 9, $F_v(\theta 1)=$ $$Fv(\theta1) = \frac{k(L1+L2)\left(-120 + \frac{\sqrt{(L1+L2-L1\cos[\theta1])^2 + L1^2\sin[\theta1]^2}}{\sqrt{(L1+L2-L1\cos[\theta1])^2 + L1^2\sin[\theta1]^2}}\right)\tan[\theta1]}{}$$

Figure 10:
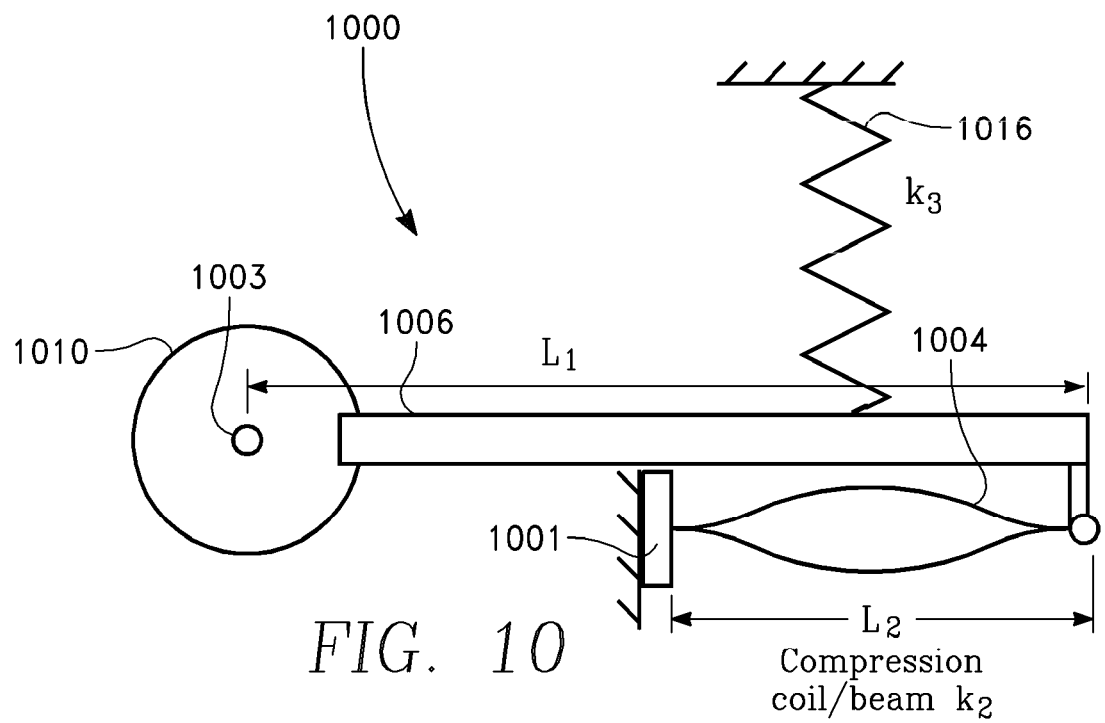
FIG. 10 is a simplified schematic illustration of negative suspension with a swing-arm.

FIG. 10 is a simplified schematic illustration of negative suspension with a swing-arm. As an example application, consider an existing swing arm 1006 of length $L_1$, rotating around its own bushing/axis 1003. This represents a typical isolating structure, and could be, for example, the swing-arm of a DVA (dynamic vibration absorber) or the control arm of a vehicle suspension. The negative stiffness spring $k_2$ is drawn here as a post-buckled beam 1004, instead of a coil spring. It is connected as a "version 1" (FIG. 9) torsional NS spring 94a. An actuator (not shown), similar to those described in U.S. non-provisional application Ser. No. 14/214,242 and provisional application 61/800,827, incorporated by reference in their entireties, or other adjustment means can compress the beam at 1001 and thus change the overall negative stiffness. To create an isolating system, a 2nd, linear spring $k_3$, reference number 1016, is placed in parallel with the negative torsional system.

Figure 11:
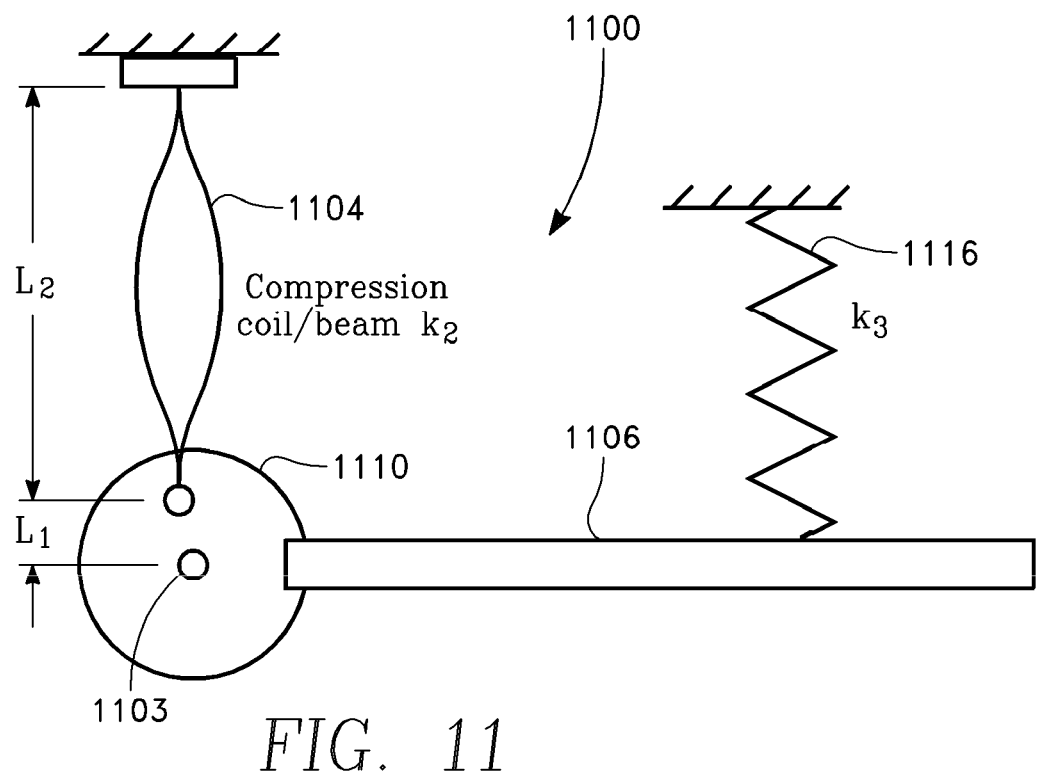
FIG. 11 is a simplified schematic illustration of negative suspension via a rocker.

FIG. 11 is a simplified schematic illustration of negative suspension via a rocker 1110. As a second embodiment, consider a similar swing arm with positive $k_3$ spring, reference number 1116, which now gains variable negative stiffness through a "version 2" (FIG. 9) mechanism. In FIG. 11, the $L_1$ arm is simply the radius of the disc rigidly connected to the swing arm 1106 and rotating around the same axis 1103. Note that because we use negative torsional stiffness, the compression beam 1104 can be positioned at any angle to the swing arm 1106 and still generate the same overall negative stiffness. Just as in the previous embodiment, the NS can be controlled through an actuator (not shown) at the boundary 1101 of $k_2$.

A benefit of swing-arm packaging is that it can provide an extra degree of design freedom allowing for easy tradeoff of stroke for force. This often allows for better packaging because stroke can be difficult to obtain in negative stiffness mechanisms. Another benefit is easier integration into existing platforms, especially vehicle suspensions.

Thus, in various embodiments, a beam, or beams is/are arranged for rotation about an axis. The beam/beams is/are arranged between input tuning (actuator) and output (output coupler) ports. With several specific geometries, the tuning port can change the beam effective length, change shear stiffness (with respect to the input/output ports), and/or change buckling mode. Thus, the input tuning port can have an adjustment means, such as a rail, screw, actuator, or the like, to adjust an effective bending length of the negative stiffness members. The adjustment means may include a means to adjust a distance between the base and the rotatable section, such as by moving the base, or moving a plate associated with the base, or by moving the negative stiffness members by directly contacting them. The negative stiffness members may be mounted to an adjustment or clamping plate, with the adjustment means including a screw or other actuator to adjust a distance between the adjustment plate and the base, for example, so as to adjust the distance between the adjustment plate and the rotatable section. The effective bending length can be adjusted by compressing and/or bending the negative stiffness members, or by shortening the length of the bendable portion of the beam by changing a relative position of the negative stiffness beam with respect to a guide or guides.

It is worthy to note that any reference to "one embodiment/implementation" or "an embodiment/implementation" means that a particular feature, structure, action, or characteristic described in connection with the embodiment/implementation may be included in an embodiment/implementation, if desired. The appearances of the phrase "in one embodiment/implementation" in various places in the specification are not necessarily all referring to the same embodiment/implementation.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. For example, various embodiments may have a single base or multiple bases, which may include an optional alignment shaft, or, in some embodiments, other coupling means may be employed between one or more bases and the rotatable section to maintain the relative alignment and/or coupling between them, while allowing rotation of the rotatable section.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or member can actually be representative or equivalent members. Again, these are implicitly included in this disclosure. Where the invention is described in device-oriented terminology, each member of the device implicitly performs a function. It should also be understood that a variety of changes may be made without departing from the essence of the invention. Such changes are also implicitly included in the description. These changes still fall within the scope of this invention.

Further, each of the various members of the invention and claims may also be achieved in a variety of manners. This disclosure should be understood to encompass each such variation, be it a variation of any apparatus embodiment, a method embodiment, or even merely a variation of any member of these. Particularly, it should be understood that as the disclosure relates to members of the invention, the words for each member may be expressed by equivalent apparatus terms even if only the function or result is the same. Such equivalent, broader, or even more generic terms should be considered to be encompassed in the description of each member or action. Such terms can be substituted where desired to make explicit the implicitly broad coverage to which this invention is entitled. It should be understood that all actions may be expressed as a means for taking that action or as a member which causes that action. Similarly, each physical member disclosed should be understood to encompass a disclosure of the action which that physical member facilitates. Such changes and alternative terms are to be understood to be explicitly included in the description.

While the present invention has been described in connection with certain exemplary embodiments, it is to be understood that the invention is not limited to the disclosed embodiments; on the contrary, it is intended to cover various modifications and equivalent arrangements included within the spirit and scope of the appended claims, and equivalents thereof.

What is claimed is:

1. An adjustable rotational spring comprising:
    a) a negative stiffness member having a region of negative stiffness;
    b) a torsional member having a torsional output, the torsional member being coupled to the negative stiffness member;
    c) an adjustment means to compress the negative stiffness member to change an overall negative stiffness characteristic of the rotational spring;
    d) wherein the torsional member comprises: (i) a swing arm; and (ii) a rocker having an axis of rotation, the swing arm being connected to the rocker distal from the torsional output; and
    e) a positive stiffness spring coupled to the torsional member.

2. The rotational spring of claim 1, wherein the torsional output allows an arc of movement, wherein the negative stiffness member and the torsional member are located within the arc of movement.

3. The rotational spring of claim 1, wherein the torsional output allows an arc of movement, and wherein the negative stiffness member is positioned on a same side of the arc of movement as the torsional member.

4. The rotational spring of claim 1, wherein the torsional output allows an arc of movement, and wherein the torsional member is located within the arc of movement and the negative stiffness member is located outside the arc of movement.

5. The rotational spring of claim 1, wherein the torsional output allows an arc of movement, and wherein the negative stiffness member is positioned on a side of the arc of movement opposite than the torsional member.

6. The rotational spring of claim 1, wherein the adjustment means comprises an actuator coupled to the negative stiffness member distal from the coupling of the negative stiffness member with the torsional member.

7. The rotational spring of claim 1, wherein the negative stiffness member is connected to the swing arm.

8. The rotational spring of claim 1, wherein the negative stiffness member is connected to the rocker.

9. The rotational spring of claim 1, wherein the positive stiffness spring is connected to the swing arm.

10. The rotational spring of claim 1, wherein the positive stiffness spring is connected to the rocker.

11. An adjustable rotational spring comprising:
    a) a negative stiffness member having a region of negative stiffness;
    b) a torsional member having a torsional output, the torsional member being coupled to the negative stiffness member at the torsional output;
    c) an adjustment means to compress the negative stiffness member to change an overall negative stiffness characteristic of the rotational spring;
    d) wherein the torsional member comprises: (i) a swing arm; and (ii) a rocker having an axis of rotation, the swing arm being connected to the rocker distal from the torsional output;
    e) wherein the negative stiffness member is connected to the swing arm; and
    f) a positive stiffness spring coupled to the torsional member.

12. The rotational spring of claim 11, wherein the positive stiffness spring is connected to the swing arm.

13. The rotational spring of claim 11, wherein the positive stiffness spring is connected to the rocker.

14. An adjustable rotational spring comprising:
    a) a negative stiffness member having a region of negative stiffness;
    b) a torsional member having a torsional output, the torsional member being coupled to the negative stiffness member;

c) an adjustment means to compress the negative stiffness member to change an overall negative stiffness characteristic of the rotational spring;
d) wherein the torsional member comprises: (i) a swing arm; and (ii) a rocker having an axis of rotation, the swing arm being connected to the rocker distal from the torsional output;
e) wherein the negative stiffness member is connected to the rocker; and
f) a positive stiffness spring coupled to the torsional member.

15. The rotational spring of claim 14, wherein the positive stiffness spring is connected to the swing arm.

16. The rotational spring of claim 14, wherein the positive stiffness spring is connected to the rocker.

* * * * *